(12) United States Patent
Zhang et al.

(10) Patent No.: US 12,284,242 B2
(45) Date of Patent: Apr. 22, 2025

(54) METHOD FOR CONTROLLING EDGE NODE, NODE, AND EDGE COMPUTING SYSTEM

(71) Applicant: Huawei Cloud Computing Technologies Co., Ltd., Guizhou (CN)

(72) Inventors: Qi Zhang, Beijing (CN); Fei Qi, Shenzhen (CN); Guansheng Shu, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 364 days.

(21) Appl. No.: 17/852,724

(22) Filed: Jun. 29, 2022

(65) Prior Publication Data

US 2022/0329650 A1   Oct. 13, 2022

Related U.S. Application Data

(63) Continuation of application No. PCT/CN2020/141209, filed on Dec. 30, 2020.

(30) Foreign Application Priority Data

Dec. 31, 2019   (CN) .......................... 201911425840.1

(51) Int. Cl.
*H04L 67/1001* (2022.01)
*H04L 43/0823* (2022.01)
*H04L 67/025* (2022.01)

(52) U.S. Cl.
CPC ........ *H04L 67/1001* (2022.05); *H04L 67/025* (2013.01)

(58) Field of Classification Search
CPC ... H04L 67/1001; H04L 67/025; H04L 67/10; H04L 67/1095; H04L 41/12; H04L 41/0894; H04L 41/0893; H04L 43/0817; H04L 43/0823
USPC .......................................................... 370/242
See application file for complete search history.

(56) References Cited

U.S. PATENT DOCUMENTS

| | | | |
|---|---|---|---|
| 10,657,061 B1 * | 5/2020 | Marriner | H05K 7/1485 |
| 2007/0165532 A1 | 7/2007 | Retana et al. | |
| 2014/0328161 A1 | 11/2014 | Haddad et al. | |
| 2017/0317954 A1 * | 11/2017 | Masurekar | H04L 41/0894 |
| 2018/0062914 A1 | 3/2018 | Boutros et al. | |

(Continued)

FOREIGN PATENT DOCUMENTS

| | | |
|---|---|---|
| CN | 101390321 A | 3/2009 |
| CN | 105282045 A | 1/2016 |

(Continued)

*Primary Examiner* — Candal Elpenord
(74) *Attorney, Agent, or Firm* — Conley Rose, P.C.

(57) ABSTRACT

A control node divides a plurality of edge nodes included in an edge node cluster into N edge node sets, where each edge node set includes at least two edge nodes. The control node selects M second edge nodes from a first edge node set, where the first edge node set is one of the N edge node sets. The control node sends a control rule to the M second edge nodes, so that the second edge node performs fault detection on a first edge node according to the control rule. Therefore, when the control node cannot perform fault detection on the first edge node, the second edge node can perform fault detection on the first edge node.

20 Claims, 7 Drawing Sheets

(56) References Cited

U.S. PATENT DOCUMENTS

| | | | |
|---|---|---|---|
| 2019/0097900 A1* | 3/2019 | Rodriguez | .......... G06F 11/1484 |
| 2019/0317484 A1 | 10/2019 | Figoli et al. | |
| 2019/0318268 A1 | 10/2019 | Wang et al. | |
| 2020/0177458 A1* | 6/2020 | Rahman | .............. H04L 41/0631 |
| 2021/0144517 A1* | 5/2021 | Guim Bernat | ........ H04L 9/3247 |

FOREIGN PATENT DOCUMENTS

| | | |
|---|---|---|
| CN | 105637805 A | 6/2016 |
| CN | 102855294 B | 12/2016 |
| CN | 107872823 A | 4/2018 |
| CN | 108521461 A | 9/2018 |
| CN | 108769214 A | 11/2018 |
| CN | 109491790 A | 3/2019 |
| CN | 110399225 A | 11/2019 |
| CN | 110430069 A | 11/2019 |
| CN | 110581782 A | 12/2019 |

* cited by examiner

METHOD FOR CONTROLLING EDGE NODE, NODE, AND EDGE COMPUTING SYSTEM

CROSS-REFERENCE TO RELATED APPLICATIONS

This is a continuation of International Patent Application No. PCT/CN2020/141209 filed on Dec. 30, 2020, which claims priority to Chinese Patent Application No. 201911425840.1 filed on Dec. 31, 2019. The disclosures of the aforementioned applications are hereby incorporated by reference in their entireties.

TECHNICAL FIELD

Embodiments of this disclosure relate to the field of edge computing technologies, and in particular, to a method for controlling an edge node, a node, and an edge computing system.

BACKGROUND

Currently, edge computing has been successfully implemented and applied to a plurality of fields such as a smart city, industrial manufacturing, and logistics. In a common edge computing scenario, a terminal layer transmits a large amount of user data to an edge computing layer for preliminary processing, and then the edge computing layer synchronizes a relatively small amount of data obtained through preliminary processing to a cloud computing layer for further processing. This can improve data processing efficiency.

In the edge computing scenario, the cloud computing layer is further configured to control the edge computing layer in addition to processing the data from the edge computing layer. When the cloud computing layer cannot control the edge computing layer, normal work of the edge computing layer may be affected.

Therefore, a control method is required to control the edge computing layer when the cloud computing layer cannot control the edge computing layer.

SUMMARY

Embodiments of this disclosure provide a method for controlling an edge node, a node, and an edge computing system, to control an edge node in an edge node cluster when a control node cannot control the edge node in the edge node cluster.

A first aspect of embodiments of this disclosure provides a method for controlling an edge node, applied to a control node and including:

First, the control node divides a plurality of edge nodes included in an edge node cluster into N edge node sets, where each edge node set includes at least two edge nodes, two edge node sets may include same edge nodes, and N is a positive integer.

Then, the control node selects M second edge nodes from a first edge node set, where the first edge node set is one of the N edge node sets, and M is a positive integer.

Finally, the control node sends a control rule to the M second edge nodes, where the control rule indicates the second edge node to perform fault detection on a first edge node, and the first edge node belongs to the first edge node set.

The control node divides the plurality of edge nodes in the edge node cluster into the N edge node sets, selects a second edge node from each edge node set, and then sends the control rule to the second edge node, so that the second edge node performs fault detection on the first edge node in the edge node set in which the second edge node is located. In this way, even if the control node cannot perform fault detection on the first edge node in the edge node cluster, the second edge node in the edge node cluster can still perform fault detection on the first edge node, thereby sensing a fault status of the first edge node in time.

According to the first aspect, embodiments of this disclosure further provide a first implementation of the first aspect. That the control node divides the plurality of edge nodes included in the edge node cluster into the N edge node sets includes:

The control node selects, based on a to-be-deployed application image and an application image that has been deployed on the plurality of edge nodes included in the edge node cluster, K edge nodes from the plurality of edge nodes to form the first edge node set, where K is a positive integer greater than M.

The control node divides the edge node sets based on the to-be-deployed application image and the application image that has been deployed on the plurality of edge nodes included in the edge node cluster. Affinity and anti-affinity between the application images are considered, so that the edge node sets are more appropriately divided.

According to the first implementation of the first aspect, embodiments of this disclosure further provide a second implementation of the first aspect. After the control node selects, based on the to-be-deployed application image and the application image that has been deployed on the plurality of edge nodes included in the edge node cluster, the K edge nodes from the plurality of edge nodes to form the first edge node set, the control node enables the K edge nodes to form a hash ring.

The hash ring defines relative location relationships between the K edge nodes, so that the K edge nodes can form mapping relationships based on the relative location relationships.

According to the second implementation of the first aspect, embodiment of this disclosure further provide a third implementation of the first aspect. The first edge node and at least one second edge node are adjacent in the hash ring.

This implementation provides a mapping relationship between the first edge node and the second edge node, that is, the first edge node is adjacent to the at least one second edge node.

According to the first aspect, the first implementation of the first aspect, the second implementation of the first aspect, or the third implementation of the first aspect, embodiments of this disclosure further provide a fourth implementation of the first aspect. After the control node divides the plurality of edge nodes included in the edge node cluster into the N edge node sets, the control node deploys the to-be-deployed application images on the N edge node sets, where the to-be-deployed application images are in a one-to-one correspondence with the edge node sets.

This implementation provides a feasible solution for deploying the application image. To be specific, one application image is correspondingly deployed for each edge node set.

According to the fourth implementation of the first aspect, embodiments of this disclosure further provide a fifth implementation of the first aspect. That the control node deploys the to-be-deployed application images on the N edge node sets includes:

The control node deploys X layered images included in the to-be-deployed application image on L edge nodes in the first edge node set, where at least one layered image is deployed on each of the L edge nodes, and both L and X are positive integers greater than 1.

The at least one layered image is deployed on some edge nodes in the first edge node set, instead of deploying a complete application image on each edge node, thereby saving storage space of the edge nodes.

According to the fifth implementation of the first aspect, embodiments of this disclosure further provide a sixth implementation of the first aspect. That the control node deploys the X layered images included in the to-be-deployed application image on the L edge nodes in the first edge node set includes:

First, the control node establishes a target function for deploying the application images for the N edge node sets.

Then, the control node determines an image deployment solution based on a preset optimization algorithm and the target function.

Finally, the control node deploys, according to the image deployment solution, the X layered images included in the to-be-deployed application image on the L edge nodes in the first edge node set.

In this implementation, the control node obtains the image deployment solution by using a method of establishing the target function and optimization solving on the target function.

According to the sixth implementation of the first aspect, embodiments of this disclosure further provide a seventh implementation of the first aspect. That the control node establishes the target function for deploying the application images for the N edge node sets includes:

First, the control node establishes a first indicator and a second indicator, where the first indicator indicates reliability of deploying the application images for the N edge node sets, and the second indicator indicates balance of deploying the application images for the N edge node sets.

Then, the control node establishes the target function based on the first indicator and the second indicator.

The control node establishes the target function based on the first indicator and the second indicator, thereby ensuring application deployment balance and reliability.

According to the fifth implementation of the first aspect, the sixth implementation of the first aspect, or the seventh implementation of the first aspect, embodiments of this disclosure further provide an eighth implementation of the first aspect. After the control node deploys the X layered images included in the to-be-deployed application image on the L edge nodes in the first edge node set, the control node sends deployment information of the to-be-deployed application image to edge nodes in the first edge node set, where the deployment information of the application image includes deployment of the layered image in the to-be-deployed application image deployed on each of the L edge nodes.

The control node sends the deployment information of the application image to each edge node in the first edge node set, so that an edge node on which the X layered images are not deployed can obtain a layered image from another edge node based on the deployment information, to form a complete application image.

A second aspect of embodiments of this disclosure provides a method for controlling an edge node, applied to an edge node cluster. A plurality of edge nodes included in the edge node cluster are divided into N edge node sets, each edge node set includes at least two edge nodes, a first edge node set in the N edge node sets includes a second edge node, the second edge node stores a control rule, and N is a positive integer.

Based on the edge node cluster, the second edge node determines a first edge node from the first edge node set according to the control rule, where the control rule indicates the second edge node to perform fault detection on the first edge node.

The second edge node performs fault detection on the first edge node.

When a control node cannot perform fault detection on the first edge node in the first edge node set, the second edge node can perform fault detection on the first edge node according to the control rule, thereby sensing a fault status of the first edge node in time.

According to the second aspect, embodiments of this disclosure further provide a first implementation of the second aspect, edge nodes in the first edge node set form a hash ring.

The first edge node and the second edge node are adjacent in the hash ring.

The hash ring defines relative location relationships between K edge nodes, so that the K edge nodes can form mapping relationships based on the relative location relationships. As one of the mapping relationships, the first edge node is adjacent to the at least one second edge node.

According to the second aspect or the first implementation of the second aspect, embodiments of this disclosure further provide a second implementation of the second aspect. That the second edge node performs fault detection on the first edge node includes:

The second edge node sends a request message to the first edge node, where the request message may carry related information of the second edge node, and the related information may include an Internet Protocol (IP) address of the second edge node.

If the second edge node does not receive a response message corresponding to the request message within the preset time period, it may be determined that the first edge node is faulty.

The second edge node detects, through heartbeat detection, that the first edge node is faulty.

According to the second aspect, the first implementation of the second aspect, or the second implementation of the second aspect, embodiments of this disclosure further provide a third implementation of the second aspect, at least one of X layered images included in an application image is deployed on each of L edges in the first edge node set, and both L and X are positive integers greater than 1.

Each edge node in the first edge node set stores deployment information of the application image, and the deployment information of the application image includes deployment of the layered image in the application image deployed on each of the L edge nodes.

Based on the application image deployment, if H layered images are deployed on the second edge node, the second edge node obtains, (X−H) layered images from another edge node in the L edge nodes based on the deployment information of the application image, to form the application image, where H is a positive integer, and X is a positive integer greater than H.

The second edge node runs the application image to execute a corresponding task.

The at least one of the X layered images included in the application image is deployed on each of the L edges in the first edge node set, thereby saving storage space of the edge nodes in the first edge node set. In addition, an edge node on which the X layered images are not deployed can obtain the layered image from another edge node based on the deployment information of the application image, to form the application image, and then, the application image is run to execute the corresponding task.

In addition, if the X layered images are deployed on the second edge node, the second edge node runs the locally stored application image including the X layered images, to execute the corresponding task.

According to the third implementation of the second aspect, embodiments of this disclosure further provide a fourth implementation of the second aspect. If the first edge node is faulty, the second edge node determines, based on the deployment information of the application image, deployment of the layered image in the application image deployed on the first edge node, where the deployment of the layered image in the application image may be that at least one layered image in the application image is deployed on the first edge node, or may be that no at least one layered image in the application image is deployed on the first edge node.

If at least one layered image is deployed on the first edge node, the second edge node selects an edge node meeting a preset condition from the first edge node set to execute a task of the first edge node.

If the at least one layered image deployed on the first edge node, it indicates that the first edge node runs the application image and executes the responding task before a fault occurs, and the second edge node reselects an edge node from the first edge node set to execute the task of the first edge node, thereby scheduling the task on the first edge node.

According to the fourth implementation of the second aspect, embodiments of this disclosure further provide a fifth implementation of the second aspect. That the second edge node selects the edge node meeting the preset condition from the first edge node set to execute a task of the first edge node includes:

The second edge node calculates a deployment weight of the second edge node.

The second edge node receives a deployment weight of another edge node in the first edge node set.

The second edge node selects an edge node based on the deployment weight of the second edge node and the deployment weight of the other edge node in the first edge node set, to execute the task of the first edge node.

The second edge node calculates a deployment weight of each edge node. The deployment weight may be obtained through calculation by considering a plurality of factors. Finally, the edge node is selected based on the deployment weight to execute the task of the first edge node, so as to ensure that the selected edge node is an edge node most appropriate for executing the task of the first edge node.

According to the fourth implementation of the second aspect, or the fifth implementation of the second aspect, embodiments of this disclosure further provide a sixth implementation of the second aspect. If there is no edge node meeting the preset condition in the first edge node set, the second edge node selects, from another edge node set, an edge node meeting the preset condition, to execute the task of the first edge node.

This implementation provides another solution of reselecting an edge node to execute the task of the first edge node.

According to the fourth implementation of the second aspect, or the fifth implementation of the second aspect, embodiments of this disclosure further provide a seventh implementation of the second aspect. After the second edge node selects the edge node from the first edge node set to execute the task of the first edge node, if the second edge node is selected to execute the task of the first edge node, and no layered image is deployed on the second edge node, the second edge node obtains the X layered images from the L edge nodes based on the deployment information of the application image to form the application image; and the second edge node runs the application image to execute the task of the first edge node.

The second edge node is used as an alternative edge node, and no layered image is deployed on the second edge node. When the second edge node is selected to execute the task of the first edge node, the second edge node obtains the application image from the L edge nodes based on the deployment information of the application image.

According to the second aspect, the first implementation of the second aspect, the second implementation of the second aspect, the third implementation of the second aspect, the fourth implementation of the second aspect, the fifth implementation of the second aspect, the sixth implementation of the first aspect, or the seventh implementation of the first aspect, embodiments of this disclosure further provides an eighth implementation of the second aspect. If the first edge node is faulty, the second edge node performs fault detection on an edge node on which the first edge node is responsible for performing fault detection.

Because the faulty first edge node is responsible for performing fault detection on some edge nodes, the second edge node performs fault detection on the edge nodes after the first edge node is faulty.

A third aspect of embodiments of this disclosure provides a control node, including: a scheduling module, configured to divide a plurality of edge nodes included in an edge node cluster into N edge node sets, where each edge node set includes at least two edge nodes, and N is a positive integer, where the scheduling module is further configured to select M second edge nodes from a first edge node set, where the first edge node set is one of the N edge node sets, and M is a positive integer; and a sending module, configured to send a control rule to the M second edge nodes, where the control rule indicates the second edge node to perform fault detection on a first edge node, and the first edge node belongs to the first edge node set.

According to the third aspect, embodiments of this disclosure further provide a first implementation of the third aspect. The scheduling module is configured to select, based on a to-be-deployed application image and an application image that has been deployed on the plurality of edge nodes included in the edge node cluster, K edge nodes from the plurality of edge nodes to form the first edge node set, where K is a positive integer greater than M.

According to the first implementation of the third aspect, embodiments of this disclosure further provide a second implementation of the third aspect. The scheduling module is further configured to enable the K edge nodes to form a hash ring.

According to the second implementation of the third aspect, embodiment of this disclosure further provide a third implementation of the third aspect. The first edge node and at least one second edge node are adjacent in the hash ring.

According to the third aspect, the first implementation of the third aspect, the second implementation of the third aspect, or the third implementation of the third aspect, embodiments of this disclosure further provide a fourth implementation of the third aspect. The control node further includes an image deployment module.

The image deployment module is configured to deploy X layered images included in the to-be-deployed application image on L edge nodes in the first edge node set, where at least one layered image is deployed on each of the L edge nodes, and both L and X are positive integers greater than 1.

According to the fourth implementation of the third aspect, embodiments of this disclosure further provide a fifth implementation of the third aspect. The sending module is further configured to send deployment information of the to-be-deployed application image to edge nodes in the first edge node set, where the deployment information of the application image includes deployment of the layered image in the to-be-deployed application image deployed on each of the L edge nodes.

A fourth aspect of embodiments of this disclosure provides an edge node. The edge node is a second edge node in a first edge node set, the first edge node set is one of N edge node sets, the N edge node sets are obtained by dividing a plurality of edge nodes included in an edge node cluster, each edge node set includes at least two edge nodes, the second edge node stores a control rule, and N is a positive integer; and the second edge node includes: a scheduling module, configured to determine a first edge node from the first edge node set according to the control rule, where the control rule indicates the second edge node to perform fault detection on a first edge node; and a detection module, configured to perform fault detection on the first edge node.

According to the fourth aspect, embodiments of this disclosure further provide a first implementation of the fourth aspect, edge nodes in the first edge node set form a hash ring.

The first edge node and the second edge node are adjacent in the hash ring.

According to the fourth aspect, the first implementation of the fourth aspect, embodiments of this disclosure further provide a second implementation of the fourth aspect, at least one of X layered images included in an application image is deployed on each of L edges in the first edge node set, and both L and X are positive integers greater than 1; each edge node in the first edge node set stores deployment information of the application image, and the deployment information of the application image includes deployment of the layered image in the application image deployed on each of the L edge nodes; and the edge node further includes: an image obtaining module, configured to obtain, when H layered images are deployed on the second edge node, (X−H) layered images from another edge node in the L edge nodes based on the deployment information of the application image, to form the application image, where H is a positive integer, and X is a positive integer greater than H; and an image running module, configured to run the application image to execute a corresponding task.

According to the second implementation of the fourth aspect, embodiments of this disclosure further provide a third implementation of the fourth aspect. The scheduling module is configured to determine, when the first edge node is faulty, based on the deployment information of the application image, deployment of a layered image in the application image deployed on the first edge node.

The scheduling module is further configured to select, when at least one layered image is deployed on the first edge node, an edge node from the first edge node set to execute a task of the first edge node.

According to the third implementation of the fourth aspect, embodiments of this disclosure further provide a fourth implementation of the fourth aspect. The scheduling module is further configured to obtain, when the second edge node is selected to execute the task of the first edge node, and no layered image is deployed on the second edge node, the X layered images from the L edge nodes based on the deployment information of the application image to form the application image.

The image running module is further configured to run the application image to execute the task of the first edge node.

A fifth aspect of embodiments of this disclosure provides a control node, including at least one processor and a memory. The memory stores computer-executable instructions that can run on the processor, and when the computer-executable instructions are executed by the processor, the control node performs the method for controlling an edge node according to any one of the first aspect or the possible implementations of the first aspect.

A sixth aspect of embodiments of this disclosure provides an edge node, including at least one processor and a memory. The memory stores computer-executable instructions that can run on the processor, and when the computer-executable instructions are executed by the processor, the edge node performs the method for controlling an edge node according to any one of the second aspect or the possible implementations of the second aspect.

A seventh aspect of embodiments of this disclosure provides an edge computing system, including a control node and an edge node cluster.

A plurality of edge nodes included in the edge node cluster are divided into N edge node sets, each edge node set includes at least two edge nodes, a first edge node set in the N edge node sets includes a second edge node, the second edge node stores a control rule, and N is a positive integer.

The control node is configured to perform the method for controlling the edge node according to any one of the first aspect or the possible implementations of the first aspect.

The second edge node is configured to perform the method for controlling the edge node according to any one of the second aspect or the possible implementations of the second aspect.

An eighth aspect of embodiments of this disclosure provides a chip or a chip system. The chip or the chip system includes at least one processor and a communications interface, the communications interface and the at least one processor are interconnected through a line, and the at least one processor is configured to run computer programs or instructions, so as to perform the method for controlling a node according to any one of the implementations of the first aspect.

A ninth aspect of embodiments of this disclosure provides a chip or a chip system. The chip or the chip system includes at least one processor and a communications interface, the communications interface and the at least one processor are interconnected through a line, and the at least one processor is configured to run computer programs or instructions, so as to perform the method for the edge node according to any one of the implementations of the second aspect.

A tenth aspect of embodiments of this disclosure provides a computer storage medium. The computer storage medium is configured to store computer software instructions used by the foregoing control node or edge node, and the computer software instructions include a program designed for the control node or edge node.

The control node may be the control node described in the third aspect.

The edge node may be the edge node described in the fourth aspect.

An eleventh aspect of embodiments of this disclosure provides a computer program product. The computer program product includes computer software instructions, and the computer software instructions may be loaded by using a processor to implement the method for controlling an edge node according to any one of the first aspect or the second aspect.

It can be learned from the foregoing technical solutions that embodiments of this disclosure have the following advantages:

The control node divides the plurality of edge nodes included in the edge node cluster into the N edge node sets, where each edge node set includes at least two edge nodes, and N is a positive integer. The control node selects the M second edge nodes from the first edge node set, and sends the control rule to the M second edge nodes, where the control rule indicates the second edge node to perform fault detection on the first edge node, the first edge node belongs to the first edge node set, the first edge node set is one of the N edge node sets, and M is a positive integer. In this way, when the control node cannot control the first edge node in the edge node cluster, the second edge node can detect a fault status of the first edge node.

DESCRIPTION OF EMBODIMENTS

Embodiments of this disclosure provide a method for controlling an edge node, a node, and an edge computing system, to control an edge node in an edge node cluster when the edge node cluster is in an offline scenario or a weak network scenario.

Figure 1:
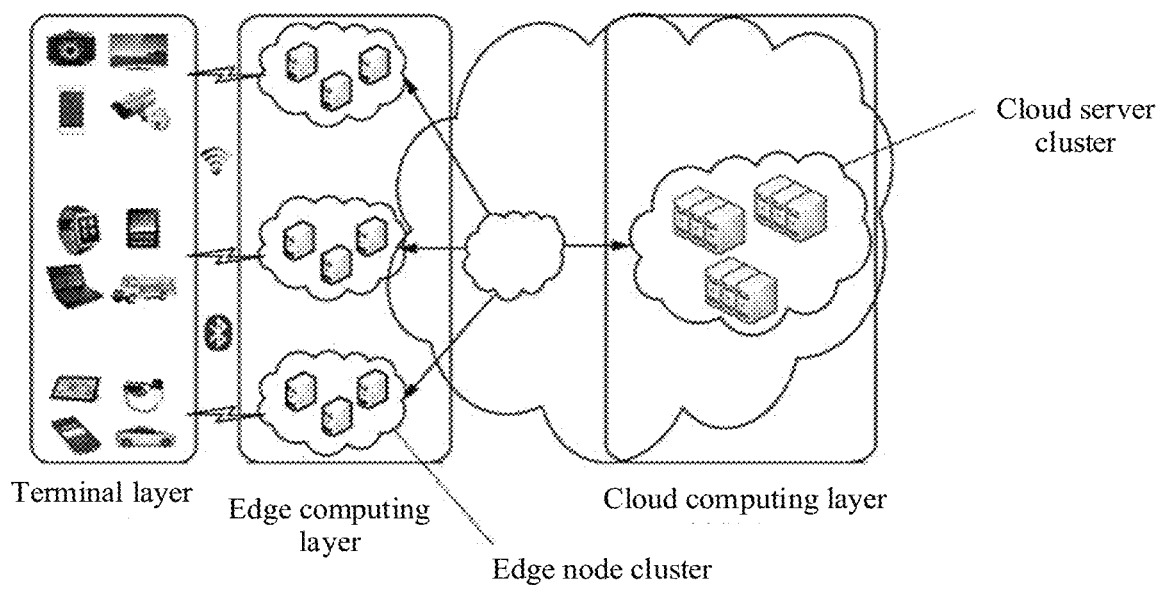
FIG. 1 is a schematic diagram of an architecture of an edge computing system according to an embodiment of this disclosure.

FIG. 1 is a schematic diagram of an architecture of an edge computing system according to an embodiment of this disclosure. As shown in FIG. 1, the edge computing system includes a terminal layer, an edge computing layer, and a cloud computing layer. The edge computing layer is in communication connection to both the terminal layer and the cloud computing layer over communications networks. The terminal layer includes a plurality of terminal devices. For example, in FIG. 1, the terminal layer may include terminal devices such as a vehicle-mounted terminal, a notebook computer, a smartwatch, a smartphone, a tablet computer, and a smart television; the edge computing layer includes at least one edge node cluster, one edge node cluster includes at least two edge nodes, and the edge node may be an edge gateway, an edge controller, an edge server, and the like; and the cloud computing layer includes at least one cloud server cluster.

The communications network between the edge computing layer and the terminal layer may be a wired communications network, or may be a wireless communications network. For example, the communications network may be a 5th-generation (5G) mobile communication technology system, a Long-Term Evolution (LTE) system, a Global System for Mobile Communications (GSM), a code-division multiple access (CDMA) network, or a wideband code-division multiple access (WCDMA) network. The communications network may be another communications network or communications system, for example, WI-FI, or the like.

The communications network between the edge computing layer and the cloud computing layer is usually a metropolitan area network.

In the edge computing system, the cloud computing layer is used to further process data preliminarily processed at the edge computing layer. In addition, the cloud computing layer is further used to control the edge computing layer, including managing and scheduling the edge node cluster. A control node is usually disposed at the cloud computing layer. The control node is used to perform centralized status management, task allocation, task scheduling, and the like on the edge node in the edge node cluster.

However, there is a case in which the control node cannot control the edge node cluster. For example, when the control node is faulty, the control node cannot control the edge node in the edge node cluster.

For another example, because the communications network between the edge computing layer and the cloud computing layer is usually the metropolitan area network, the metropolitan area network has poor stability, and is easily disconnected due to various unspecified factors, the edge computing layer is in an offline scenario or a weak network scenario. When the edge computing layer is in the offline scenario or the weak network scenario, the control node cannot control the edge node in the edge node cluster.

Therefore, embodiments of this disclosure provide a method for controlling an edge node. When a control node cannot control an edge node in an edge computing cluster, the method can be used to control the edge node in the edge node cluster. It should be noted that, when the control node can control the edge node in the edge computing cluster, the method in embodiments of this disclosure may also be used to assist the control node to control the edge node in the edge computing cluster.

To better understand the method for controlling the edge node provided in embodiments of this disclosure, the following describes the method in detail. There are two application scenarios of the method. One is that the control node controls the edge node in the edge node cluster, and the other is that the edge node cluster controls the internal edge nodes. The following first describes the method from a control node side.

Figure 2:
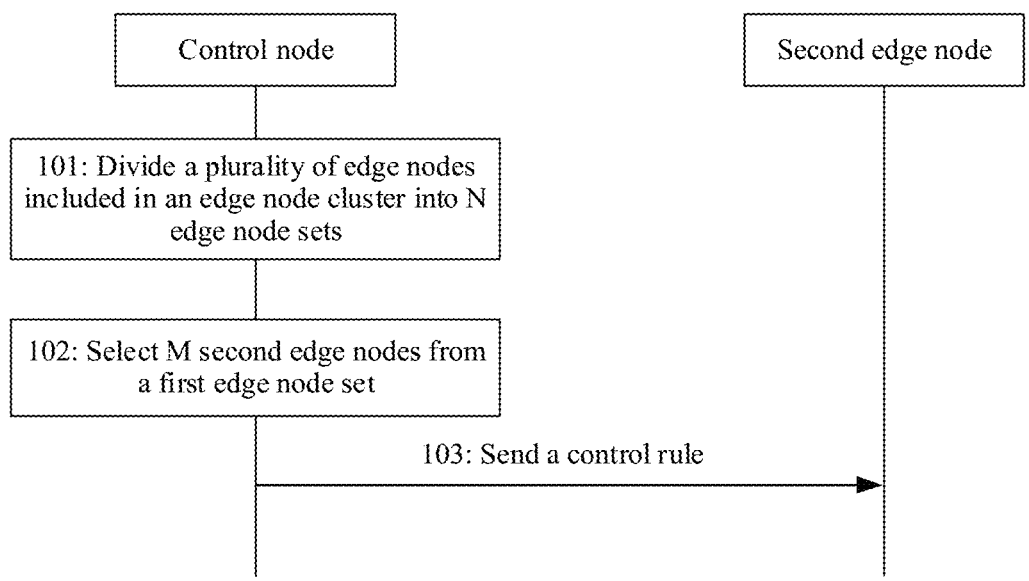
FIG. 2 is a schematic diagram of an embodiment of a method for controlling an edge node according to an embodiment of this disclosure.

FIG. 2 is a schematic diagram of an embodiment of a method for controlling an edge node according to an embodiment of this disclosure. As shown in FIG. 2, embodiments of this disclosure provide the embodiment of the method for controlling the edge node, applied to a control node, and the embodiment includes the following steps.

Step 101: The control node divides a plurality of edge nodes included in an edge node cluster into N edge node sets.

Each edge node set includes at least two edge nodes, and N is a positive integer. There may be the same or different quantities of edge nodes in two edge node sets. In addition, the two edge node sets may include same edge nodes.

Figure 3:
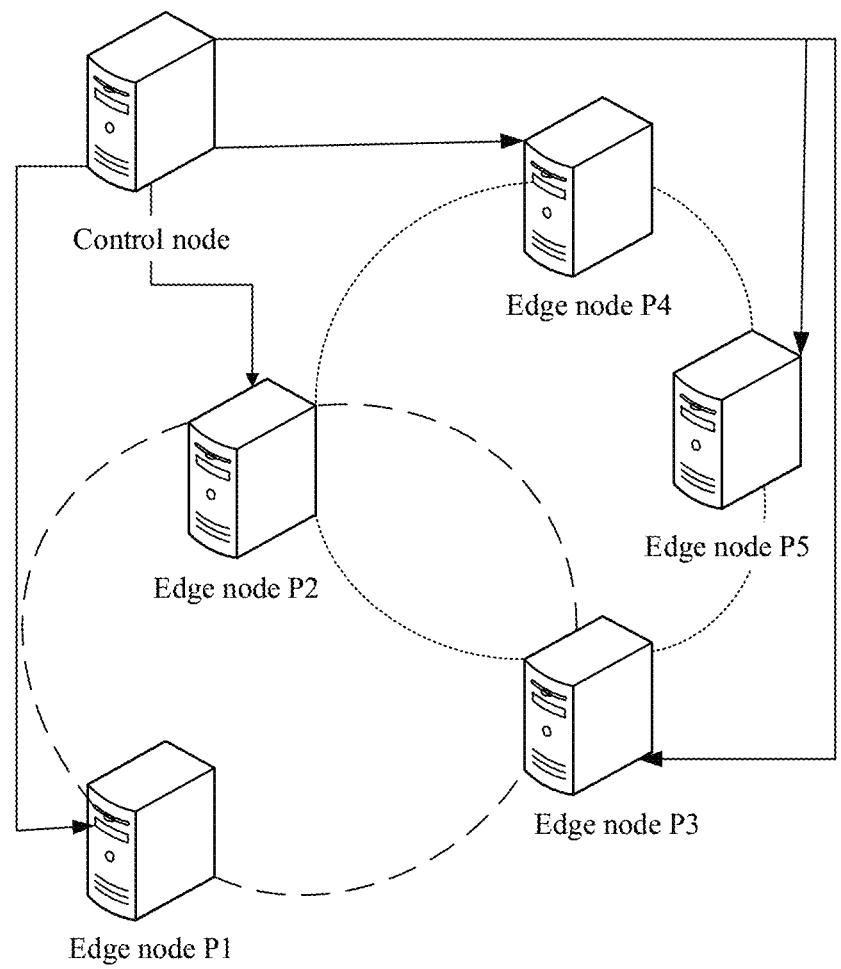
FIG. 3 is a schematic diagram of edge node sets in an edge node cluster according to an embodiment of this disclosure.

The following describes a relationship between two edge node sets with reference to FIG. 3. FIG. 3 is a schematic diagram of edge node sets in an edge node cluster according to an embodiment of this disclosure. The edge node cluster includes edge nodes P1, P2, P3, P4, and P5, which are divided into two edge node sets. One edge node set includes the edge nodes P1, P2, and P3, the other edge node set includes the edge nodes P2, P3, P4, and P5, and the two edge node sets include the same edge nodes P2 and P3.

It should be noted that there is a plurality of methods for the control node to divide the edge node cluster into the N edge node sets, and the methods may be selected according to an actual requirement. This is not limited in this embodiment of this disclosure.

For example, the edge node cluster may be divided into the N edge node sets based on an actual situation of each edge node. The actual situation includes but is not limited to a status of the edge node, a resource of the edge node, storage space (including memory and disk space) of the edge node, CPU usage of the edge node, and memory usage of the edge node. The status of the edge node may be a faulty state or a non-faulty state. A first edge node set in the N edge node sets is used as an example. Non-faulty edge nodes whose resources, storage space, and CPU usage all meet a preset condition may be selected from the edge node cluster, to form the first edge node set.

In addition, to enable the edge node cluster to execute a corresponding task, where the task may be a task such as image preprocessing and data anonymization, a plurality of application images needs to be deployed in the edge node cluster. Therefore, the control node may further divide the edge node cluster into the N edge node sets based on the to-be-deployed application images.

For example, that the control node divides the plurality of edge nodes included in the edge node cluster into the N edge node sets includes:

First, the control node determines a quantity of edge node sets based on a quantity of to-be-deployed application images. For example, one application image corresponds to one edge node set. Then, the control node selects appropriate edge nodes from the edge node cluster based on a type of an application image to form an edge node set.

For example, that the control node divides the plurality of edge nodes included in the edge node cluster into the N edge node sets includes:

The control node selects, based on a to-be-deployed application image and an application image that has been deployed on the plurality of edge nodes included in the edge node cluster, K edge nodes from the plurality of edge nodes to form the first edge node set, where K is a positive integer.

It is assumed that the to-be-deployed application image is a first application image, and a second application image has been deployed on some of the plurality of edge nodes included in the edge node cluster, affinity and anti-affinity between the first application image and the second application image may be considered in a process of forming the first edge node set corresponding to the first application image. For example, if there is affinity between the first application image and the second application image, edge nodes on which the second application image has been deployed may be selected as much as possible to form the first edge node set. If there is anti-affinity between the first application image and the second application image, edge nodes on which the second application image is not deployed may be selected as much as possible to form the first edge node set.

Step 102: The control node selects M second edge nodes from the first edge node set, where the first edge node set is one of the N edge node sets, and M is a positive integer.

After the plurality of edge nodes in the edge node cluster are divided into the N edge node sets, the control node selects the M second edge nodes from the first edge node set. The control node may select the M second edge nodes according to a specific rule, or may randomly select the M second edge nodes. A quantity K of edge nodes in the first edge node set is greater than M.

The following uses an example to describe a process of selecting the M second edge nodes according to the specific rule.

After the control node selects, based on the to-be-deployed application image and the application image that has been deployed on the plurality of edge nodes included in the edge node cluster, the K edge nodes from the plurality of edge nodes to form the first edge node set, the control node enables the K edge nodes to form a hash ring.

Figure 4:
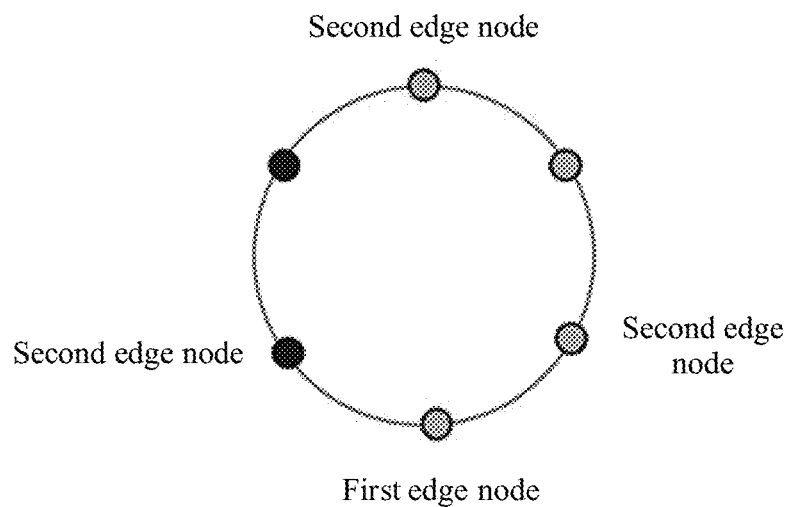
FIG. 4 is a schematic diagram of an embodiment of a hash ring according to an embodiment of this disclosure.

FIG. 4 is a schematic diagram of an embodiment of a hash ring according to an embodiment of this disclosure. The hash ring includes six edge nodes, and the six edge nodes form relative location relationships in the hash ring. In this way, the control node can select the M second edge nodes from the first edge node set based on the hash ring, to perform fault detection on a first edge node.

It may be understood that there may be a plurality of relative location relationships between the M second edge nodes and the first edge node in the hash ring. For example, the first edge node and at least one second edge node are adjacent in the hash ring.

When M is equal to 1, the first edge node is adjacent to the second edge node. When M is equal to 2, in FIG. 4, for example, the two second edge nodes may be adjacent to the first edge node, or one of the two second edge nodes may be adjacent to the first edge node, and the other second edge node is distributed relative to the first edge node. When M is greater than 2, only one second edge node or two second edge nodes can be adjacent to the first edge node.

In addition, after the K edge nodes form the hash ring, the control node may further deliver information about the hash ring to each of the K edge nodes, so that each edge node can determine a location of another edge node in the hash ring based on the information about the hash ring.

Step 103: The control node sends a control rule to the M second edge nodes, where the control rule indicates the second edge node to perform fault detection on the first edge node, and the first edge node belongs to the first edge node set.

After selecting the M second edge nodes, the control node sends the control rule to the M second edge nodes, so that the second edge node performs fault detection on the first edge node.

M may have a plurality of values. When M is 1, only one second edge node performs fault detection on the first edge node. To better perform fault detection on the first edge node, M may be set to be greater than or equal to 2. In this way, at least two second edge nodes perform fault detection on the first edge node. However, if fault detection needs to be performed on each edge node in the first edge node set, when M is greater than or equal to 2, it means that there are second edge nodes in the first edge node set, and the second edge nodes need to perform fault detection on at least two first edge nodes. In addition, as M increases, a quantity of first edge nodes that need to be detected by the second edge nodes further increases. This certainly increases load of the second edge node. Therefore, to reduce the load of the second edge node, M may be set to a small value, for example, M may be 2 or 3.

Different first edge nodes may correspond to M same or different second edge nodes. When M is greater than or equal to 2, if the different first edge nodes correspond to M different second edge nodes, there are two cases. In a first case, there is a same second edge node in the M second edge nodes corresponding to the different first edge nodes. In a second case, there is no same second edge node in the M second edge nodes corresponding to the different first edge nodes. For example, M is equal to 2. In a case in which two second edge nodes correspond to one first edge node, and two second edge nodes correspond to another first edge node, there may be one same second edge node, one different second edge node, or no same second edge node. In addition, different first edge nodes may correspond to different quantities of second edge nodes. For example, one first edge node corresponds to two second edge nodes, and another first edge node corresponds to three second edge nodes.

Because the different first edge nodes correspond to the M same or different second edge nodes, edge nodes in the first edge node set may be responsible for performing fault detection on different quantities of edge nodes. For example, it is assumed that the first edge node set includes four edge nodes, one edge node may need to perform fault detection on three other edge nodes, two edge nodes need to perform fault detection on two other edge nodes, and the other edge node does not need to perform fault detection on other edge nodes.

Therefore, to better balance load of each edge node in the first edge node set, the second edge node may be appropriately selected and the control rule may be configured, so that each edge node in the first edge node set performs fault detection on another edge node. Further, each edge node may need to detect a same quantity of other edge nodes. For example, when M is equal to 2, the control rule may be configured, so that each edge node needs to perform fault detection on two other edge nodes.

In this embodiment of this disclosure, the control node divides the plurality of edge nodes in the edge node cluster into the N edge node sets, selects the second edge node from each edge node set, and then sends the control rule to the second edge node, so that the second edge node performs fault detection on the first edge node in the edge node set in which the second edge node is located. In this way, even if the control node cannot perform fault detection on the first edge node in the edge node cluster, the second edge node in the edge node cluster can perform fault detection on the first edge node, thereby sensing a fault status of the first edge node in time. In addition, because the second edge nodes corresponding to the different first edge nodes may be different, no edge node in the edge node cluster is responsible for performing fault detection on all other edge nodes, which avoids a case in which a fault status of another edge node cannot be sensed because the edge node responsible for fault detection is faulty. In addition, the first edge nodes corresponding to the second edge nodes may be only some edge nodes in the edge node cluster. Compared with a solution in which the second edge node needs to perform fault detection on all the edge nodes in the edge node cluster other than the second edge node, this embodiment of this disclosure can reduce load of the second edge node.

The foregoing describes a case in which the control node indicates the second edge node to perform fault detection on the first edge node. The following describes a case in which the control node deploys the application images in the edge node cluster. There is a plurality of methods for deploying the application images. This is not limited in this embodiment of this disclosure.

For example, after the control node divides the plurality of edge nodes included in the edge node cluster into the N edge node sets, the control node deploys the to-be-deployed application images on the N edge node sets, where the to-be-deployed application images are in a one-to-one correspondence with the edge node sets.

Because different edge node sets may include same edge nodes, two or more types of application images may be deployed on a same edge node.

The edge node cluster shown in FIG. 3 is used as an example. The edge node P2 and the edge node P3 in the edge node cluster both exist in two edge node sets. If one type of application image is deployed in each of the two edge node sets, two types of application images may be deployed on both the edge node P2 and the edge node P3.

It should be noted that there is a plurality of methods for deploying an application image in an edge node set. For example, an application image may be deployed on each edge node in the edge node set. In this way, each edge node can run the application image to execute a corresponding task. Alternatively, an application image may be deployed on some edge nodes in the edge node set. The edge nodes in the edge node set are first divided into two types: an initial edge node and an alternative edge node. For example, as shown in FIG. 4, two black edge nodes on the left of the hash ring shown in FIG. 4 may be used as alternative edge nodes, and remaining four edge nodes are used as initial edge nodes. Then, an application image is deployed on each initial edge node, but no application image is deployed on the alternative edge node. In this way, the initial edge node may run the application image to execute a corresponding task.

When the initial edge node is faulty or the initial edge node needs to process a large quantity of tasks, the alternative edge node is used for scheduling.

However, storage space is limited for each edge node in the edge node cluster. If a complete application image is deployed on each edge node, large storage space of the edge node is occupied. As a result, available storage space for the edge node is reduced. For this problem, the application image may be divided into a base image and an upper-layer software package image, and the upper-layer software package image may be divided into a plurality of parts. Therefore, only the base image or a part of the upper-layer software package image can be deployed on the edge node, to save the storage space of the edge node. When the edge node needs to execute the task, the edge node can obtain another part of the image from another edge node to form the application image.

For example, after the control node divides the plurality of edge nodes included in the edge node cluster into the N edge node sets, the control node deploys X layered images included in the to-be-deployed application image on L edge nodes in the first edge node set, where at least one layered image is deployed on each of the L edge nodes, and both L and X are positive integers greater than 1.

Figure 5:
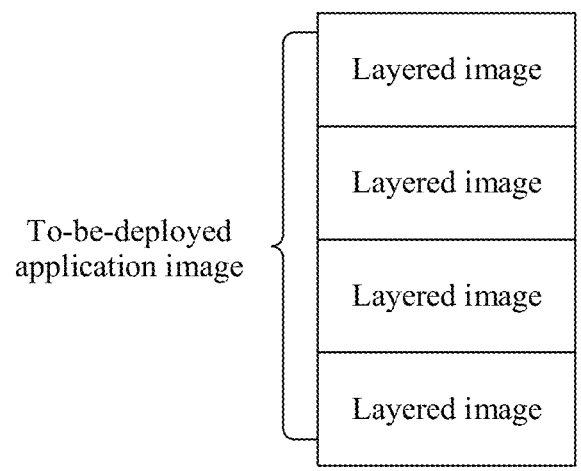
FIG. 5 is a schematic diagram of an embodiment of a to-be-deployed application image according to an embodiment of this disclosure.

The at least one layered image deployed on each edge node may include the base image in the to-be-deployed application image, and may include a part of the upper-layer software package image. FIG. 5 is a schematic diagram of an embodiment of a to-be-deployed application image according to an embodiment of this disclosure. The application image includes four layered images, and at least one of the four layered images may be deployed on each edge node.

In the first edge node set, a same quantity or different quantities of layered images may be deployed on different edge nodes.

When L is less than the quantity K of edge nodes in the first edge node set, it indicates that there is an alternative edge node in the first edge node set, and no layered image is deployed on the alternative edge node.

To ensure reliability of deploying the layered image, a same layered image may be deployed on a plurality of edge nodes, that is, a same layered image corresponds to a plurality of copies. For example, if the same layered image is deployed on three edge nodes at the same time, the layered image corresponds to three copies. To ensure balance between the layered images, each layered image may correspond to a same quantity of copies.

Figure 6:
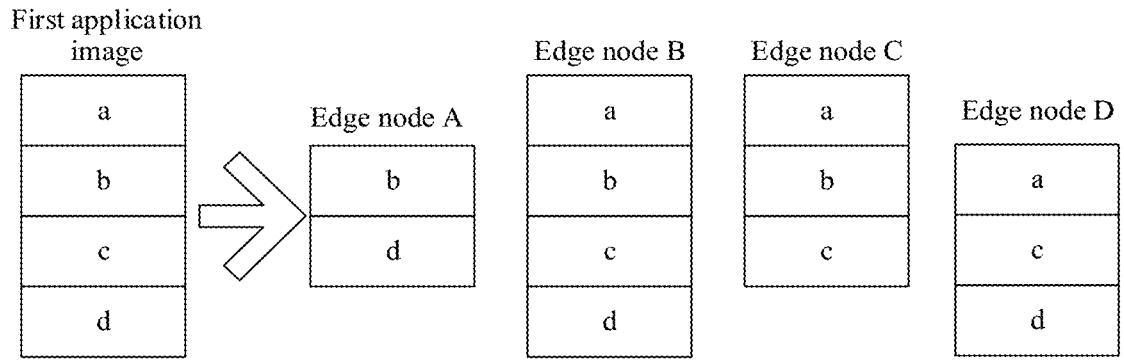
FIG. 6 is a schematic diagram of an embodiment of deploying a to-be-deployed application image according to an embodiment of this disclosure.

For ease of understanding, the following further uses an example to describe a process in which the control node deploys the X layered images included in the to-be-deployed application image on the L edge nodes in the first edge node set. FIG. 6 is a schematic diagram of an embodiment of deploying a to-be-deployed application image according to an embodiment of this disclosure.

As shown in FIG. 6, it is assumed that a first edge node set includes edge nodes A, B, C, and D, the to-be-deployed application image includes layered images a, b, c, and d, each layered image corresponds to three copies, the layered images b and d are deployed on the edge node A, the layered images a, b, c, and d are deployed on the edge node B, the layered images a, b, and c are deployed on the edge node C, and the layered images a, c, and d are deployed on the edge node D. The layered image b is used as an example. The layered image b is separately deployed on the edge nodes A, B, and C. It can be seen from this that in the four edge nodes shown in FIG. 6, the layered images a, b, c, and d are deployed only on the edge node B, that is, the complete application image is deployed on the edge node B. Therefore, the edge node B can directly run the stored application image, without obtaining the layered image from another edge node, to execute the corresponding task. The layered images b and d are deployed on the edge node A. Therefore, the edge node A needs to obtain the layered images a and c from another edge node to form the complete application image. For example, the layered images a and c may be obtained from any edge node of the edge nodes B, C, and D. Situations of the edge node C and the edge node D are similar to the situation of the edge node A. For specific understanding, refer to related description of the edge node A.

It should be noted that the first edge node set is one of the N edge node sets. For another edge node set in the N edge node sets, image deployment may be performed by using a same method as the method used in the first edge node set. To be specific, a layered image is separately deployed on a plurality of edge nodes, or the complete application image may be directly deployed on a plurality of edge nodes. This is not limited in this embodiment of this disclosure.

Figure 7:
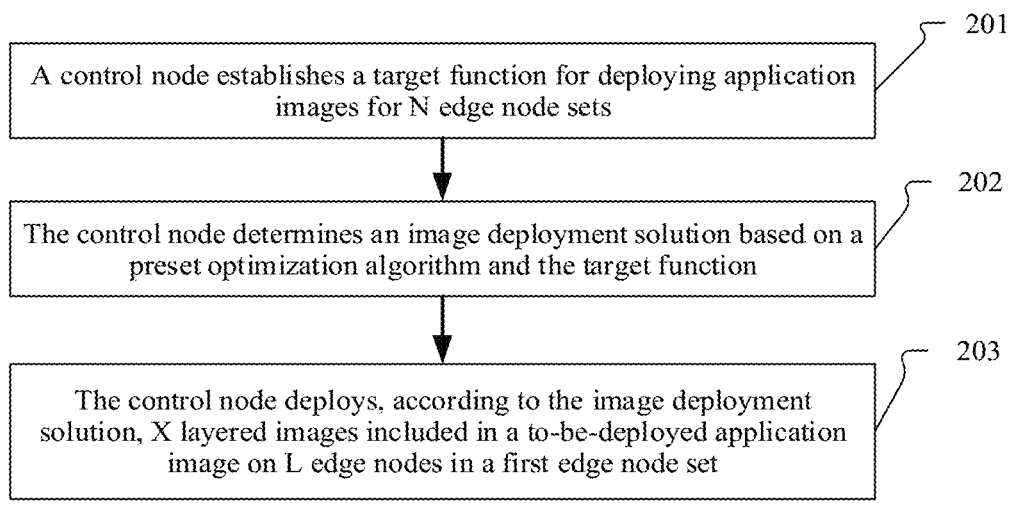
FIG. 7 is a schematic diagram of an embodiment of deploying an application image according to an embodiment of this disclosure.

The foregoing describes the process of deploying the application image in the first edge node set. It may be understood that there are many solutions for deploying the at least one layered image on each of the L edge nodes. To obtain a better deployment solution, to deploy a layered image on each of the L edge nodes, embodiments of this disclosure provide a deployment method. For details, refer to FIG. 7. FIG. 7 is a schematic diagram of an embodiment of deploying an application image according to an embodiment of this disclosure. As shown in FIG. 7, that a control node deploys X layered images included in a to-be-deployed application image on L edge nodes in a first edge node set includes the following steps.

Step 201: The control node establishes a target function for deploying application images for N edge node sets.

It should be noted that there is a plurality of methods for establishing the target function. This is not limited in this embodiment of this disclosure.

Step 202: The control node determines an image deployment solution based on a preset optimization algorithm and the target function.

In step 201, the control node establishes the target function. In step 202, the control node performs optimization solving on the target function based on the optimization algorithm, to obtain the image deployment solution in which the X layered images included in the to-be-deployed application image can be deployed on the L edge nodes in the first edge node set. The obtained image deployment solution may be an optimal image deployment solution. However, the obtained image deployment solution may also be a suboptimal image deployment solution because there are a large quantity of deployment solutions.

Step 203: The control node deploys, according to the image deployment solution, the X layered images included in the to-be-deployed application image on the L edge nodes in the first edge node set.

In this embodiment of this disclosure, the control node first establishes the target function for deploying the application images for the N edge node sets, and then obtains the image deployment solution through optimization solving on the target function. Finally, the control node can deploy at least one layered image on each of the L edge nodes according to the image deployment solution obtained through optimization solving.

It should be noted that, in the foregoing embodiment, there may be a plurality of methods for establishing the target function by the control node, and there may also be a plurality of target functions. In an implementation, that the control node establishes the target function for deploying the application images for the N edge node sets includes:

First, the control node establishes a first indicator and a second indicator, where the first indicator indicates reliability of deploying the application images for the N edge node sets, and the second indicator indicates balance of deploying the application images for the N edge node sets.

It should be noted that there is a plurality of choices for the first indicator and the second indicator, and correspondingly, there are a plurality of methods for establishing the first indicator and the second indicator. For example, the first indicator may be $U=\Sigma 1\leq i\leq Z, 1\leq j\leq Xi, 1\leq r\leq C\ G\ (F_{i,j,r})$, where Z indicates a total quantity of application images deployed in an edge node cluster, Xi indicates a quantity of layered images included in an $i^{th}$ application image, C indicates a quantity of copies corresponding to a $j^{th}$ layered image in the $i^{th}$ application image, $F_{i,j,r}$ indicates an edge node on which an $r^{th}$ copy corresponding to the $j^{th}$ layered image in the $i^{th}$ application image is deployed, $G\ (F_{i,j,r})=1-c^*M_F$, c is a constant, $G(F_{i,j,r})$ indicates reliability of deploying the $r^{th}$ copy corresponding to the $j^{th}$ layered image in the $i^{th}$ application image on an edge node $F_{i,j,r}$, and $M_F$ indicates a quantity of edge node sets in which the edge node $F_{i,j,r}$ is located. The second indicator may be $$D(Q) = \frac{\sum (Q\mu)^2}{W},$$

where $$Q = \left[\frac{T_1}{R_1}, \frac{T_2}{R_2}, \ldots, \frac{T_W}{R_W}\right], W$$

indicates a quantity of edge nodes in the edge node cluster, $\mu$ indicates an average value of Q, $R_W$ indicates remaining storage space of a $W^{th}$ edge node, $T_W=\Sigma_{1\leq i\leq Z,1\leq j\leq Xi}S_{i,j}$, and $S_{i,j}$ indicates storage space required for deploying the $j^h$ layered image in the $i^{th}$ application image.

Then, the control node establishes the target function based on the first indicator and the second indicator. Corresponding to the first indicator and the second indicator, the target function may be a $O(F_{i,j,r})=\alpha U-\beta D(Q)$. A constraint condition is that the quantity of edge nodes $F_{i,j,r}$ is greater than or equal to 1 and less than or equal to Z, and $0\leq T_W\leq R_W$.

For example, after the control node deploys the X layered images included in the to-be-deployed application image on the L edge nodes in the first edge node set, the control node sends deployment information of the to-be-deployed application image to the edge nodes in the first edge node set. The deployment information of the application image includes deployment of a layered image in the to-be-deployed application image deployed on each of the L edge nodes.

In this way, each edge node in the first edge node set can determine, based on the deployment information, the layered image deployed on the edge node of the L edge nodes. When the application image needs to be run to execute the task, the edge node can obtain a corresponding layered image from another edge node based on the deployment information, to form the application image.

The foregoing describes, from the control node side, the method for controlling the edge node provided in embodiments of this disclosure. The following describes, from an edge node cluster side, the method for controlling the edge node provided in embodiments of this disclosure.

Figure 8:
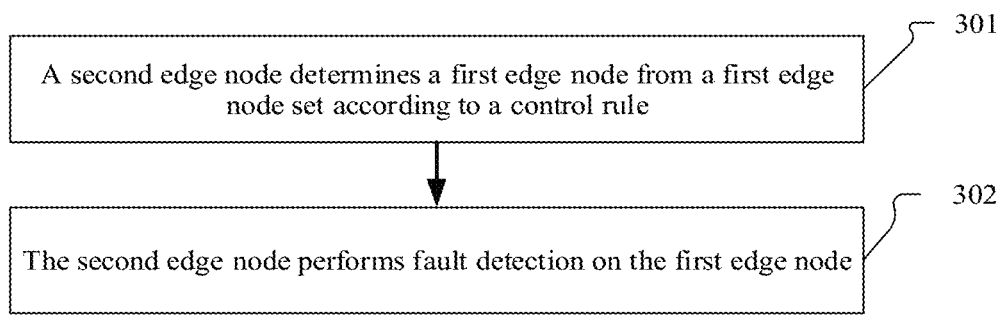
FIG. 8 is a schematic diagram of another embodiment of a method for controlling an edge node according to an embodiment of this disclosure.

FIG. 8 is a schematic diagram of another embodiment of a method for controlling an edge node according to an embodiment of this disclosure. Embodiments of this disclosure provide the other embodiment of the method for controlling the edge node, applied to an edge node cluster.

It can be learned from the foregoing embodiment that the control node divides the edge node cluster. The plurality of edge nodes included in the edge node cluster are divided into the N edge node sets, where each edge node set includes the at least two edge nodes. The first edge node set in the N edge node sets includes the second edge node, the second edge node stores the control rule, and there may be M second edge nodes, where both M and N are positive integers.

Based on the edge node cluster, the method includes the following steps.

Step 301: The second edge node determines a first edge node from the first edge node set according to the control rule.

Because the control rule indicates the second edge node to perform fault detection on the first edge node, the second edge node can determine the first edge node according to the control rule. The control rule may include a mapping relationship between the second edge node and the first edge node.

There is a plurality of mapping relationships between the second edge node and the first edge node. For example, edge nodes in the first edge node set form a hash ring. It can be learned from the foregoing embodiment that the control node delivers the information about the hash ring to each edge node in the first edge node set, so that each edge node can determine the location of the other edge node in the hash ring based on the information about the hash ring. Therefore, the second edge node can determine the first edge node based on the information about the hash ring and the relative location relationships between the second edge node and the first edge node in the hash ring. For example, as shown in FIG. 4, the first edge node and the second edge node are adjacent in the hash ring, that is, the second edge node may determine an adjacent edge node in the hash ring as the first edge node. As shown in FIG. 4, the first edge node and the second edge node may also be relatively distributed in the hash ring, that is, the second edge node may determine an edge node opposite to the first edge node in the hash ring as the first edge node.

Step 302: The second edge node performs fault detection on the first edge node.

After determining the first edge node, the second edge node performs fault detection on the first edge node. The fault detection may be performed periodically. There is a plurality of specific fault detection methods. This is not limited in this embodiment of this disclosure.

For example, the second edge node may implement fault detection on the first edge node through heartbeat detection. The second edge node sends a request message to the first edge node, where the request message may carry related information of the second edge node, and the related information may include an IP address of the second edge node. If the second edge node does not receive a response message corresponding to the request message within a preset time period, it may be determined that the first edge node is faulty.

In this embodiment of this disclosure, when the control node cannot perform fault detection on the first edge node in the first edge node set, the second edge node can perform fault detection on the first edge node according to the control rule, thereby sensing a fault status of the first edge node in time. In addition, because the second edge nodes corresponding to the different first edge nodes may be different, no edge node in the edge node cluster is responsible for performing fault detection on all other edge nodes, which avoids a case in which a fault status of another edge node cannot be sensed because the edge node responsible for fault detection is faulty. In addition, the first edge nodes corresponding to the second edge nodes may be only some edge nodes in the edge node cluster. Compared with a solution in which the second edge node needs to perform fault detection on all the edge nodes in the edge node cluster other than the second edge node, this embodiment of this disclosure can reduce load of the second edge node.

It should be understood that the edge node cluster needs to run the application image to execute a corresponding task, and there is a plurality of cases of deploying the application images in the edge node cluster.

For example, one application image is deployed on each of the N edge node sets. There is also a plurality of cases of deploying the application image in one edge node set. The first edge node set is used as an example. Assuming that an application image is deployed in the first edge node set, the application image may be deployed on each edge node in the first edge node set, or the application image is deployed on some edge nodes in the first edge node set.

It can be learned from the foregoing embodiment that the application image includes the base image and the upper-layer software package image, and the upper-layer software package image may be divided into the plurality of parts. Therefore, in the other embodiment of the method for controlling the edge node provided in embodiments of this disclosure, at least one of the X layered images included in the application image is deployed on each of the L edges in the first edge node set, and both L and X are positive integers greater than 1.

The at least one layered image deployed on each edge node may include the base image in the application image, and may include a part of the upper-layer software package image.

Each edge node in the first edge node set stores deployment information of the application image, and the deployment information of the application image includes the deployment of the layered image in the application image deployed on each of the L edge nodes.

Based on the foregoing deployment, the method in this embodiment further includes the following steps.

If H layered images are deployed on the second edge node, the second edge node obtains (X−H) layered images from another edge node in the L edge nodes based on the deployment information of the application image, to form the application image, where H is a positive integer, and X is a positive integer greater than H.

For example, in FIG. 6, it is assumed that the application image includes four layered images a, b, c, and d, that is, X=4. It is assumed that the second edge node is an edge node A, and the layered images b and d are deployed on the edge node A, that is, H=2. The second edge node may determine, based on the deployment information of the application image, that the layered images a, b, c, and d are deployed on an edge node B, the layered images a, b, and c are deployed on an edge node C, and the layered images a, c, and d are deployed on an edge node D. Therefore, the second edge node can obtain the layered images a and c from any one of the edge nodes B, C, and D, to form the application image.

After obtaining the application image, the second edge node can run the application image to execute a corresponding task.

If the X layered images are deployed on the second edge node, the second edge node can directly run the application image including the locally stored X layered images, without obtaining a layered image from another edge node, to execute a corresponding task.

If no layered image is deployed on the second edge node, the second edge node may be used as an alternative edge node for scheduling.

The foregoing describes fault detection performed by the second edge node on the first edge node, and describes the deployment of the application image in the first edge node set. Based on the deployment, the following describes a scheduling process after the first edge node is faulty.

Figure 9:
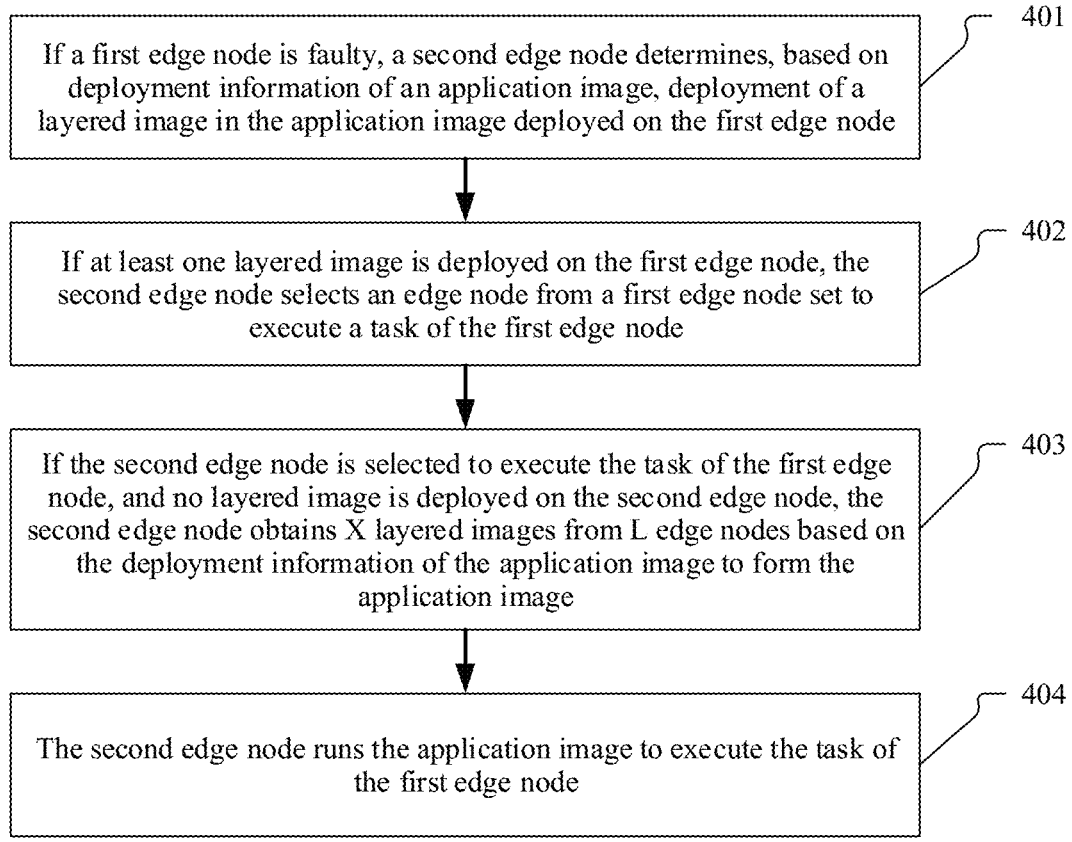
FIG. 9 is a schematic diagram of an embodiment of a scheduling process according to an embodiment of this disclosure.

In another embodiment of the method for controlling the edge node provided in embodiments of this disclosure, FIG. 9 is a schematic diagram of an embodiment of a scheduling process according to an embodiment of this disclosure. The method in this embodiment further includes the following steps.

Step 401: If the first edge node is faulty, the second edge node determines, based on the deployment information of the application image, deployment of the layered image in the application image deployed on the first edge node.

It should be noted that there is a plurality of manners of determining that the first edge node is faulty. In the first edge node set, there may be one or more second edge nodes. When there is one second edge node, if the current second edge node detects that the first edge node is faulty, it can be determined that the first edge node is faulty. When there are a plurality of second edge nodes, a corresponding rule may be set, so that only when at least E second edge nodes detect that the first edge node is faulty, it can be determined that the first edge node is faulty, where E may be 1, or may be greater than or equal to 2.

The deployment of the layered image in the application image may be that at least one layered image in the application image is deployed on the first edge node, or may be that no at least one layered image in the application image is deployed on the first edge node.

Step 402: If the at least one layered image is deployed on the first edge node, the second edge node selects an edge node from the first edge node set to execute a task of the first edge node.

If the at least one layered image is deployed on the first edge node, it indicates that the first edge node runs the application image to execute the corresponding task. Therefore, an edge node needs to be reselected to perform the task instead of the first edge node.

It should be noted that when the second edge node selects the edge node from the first edge node set, a plurality of factors may be considered. The plurality of factors may include a status of the edge node, a resource of the edge node, a memory of the edge node, disk space of the edge node, CPU usage of the edge node, memory usage of the edge node, affinity between an application image on the edge node and the application image corresponding to a layered image on the first edge node, anti-affinity between the application image on the edge node and the application image corresponding to the layered image on the first edge node, a quantity of types of application images on the edge node, a degree of exclusion between the application image on the edge node and the application image corresponding to the layered image on the first edge node, storage space occupied by the application image on the edge node, and the like.

The second edge node may calculate a deployment weight of the second edge node based on the foregoing plurality of factors, receive a deployment weight of another edge node in the first edge node set, and finally select, based on the deployment weight of the second edge node and the deployment weight of the other edge node in the first edge node set, the edge node to replace the first edge node to execute the task, thereby ensuring that the selected edge node is an edge node most appropriate for executing the task of the first edge node.

When the foregoing factors are considered, there are also many methods for selecting, by the second edge node, the edge node from the first edge node set to replace the first edge node to execute the task.

First, when there is one second edge node, the current second edge node may select one edge node to replace the first edge node to execute the task. When there are a plurality of second edge nodes, if the first edge node is faulty, all second edge nodes can usually detect that the first edge node is faulty. Therefore, the current second edge node can negotiate with another second edge node to select one edge node to replace the first edge node to execute the task.

In addition, in a process of selecting the edge node from the first edge node set, the second edge node may directly perform selection from all other edge nodes in the first edge node set other than the first edge node, or may sequentially perform selection according to a specific rule.

When the first edge node is faulty, all the second edge nodes can detect that the first edge node is faulty, but another edge node other than the second edge nodes in the first edge node set cannot detect that the first edge node is faulty. Therefore, a second edge node meeting a preset condition may be first selected from all the second edge nodes to replace the first edge node to execute the task. In this way, the second edge node does not need to send a fault message to the other edge node other than the second edge nodes in the first edge node set, where the fault message is used to indicate that the first edge node is faulty. This can reduce interaction between edge nodes, and reduce load of the edge node.

If there is no second edge node meeting the preset condition in all the second edge nodes, an edge node may be selected from other edge nodes other than the second edge nodes in the first edge node set to replace the first edge node to execute the task. Some edge nodes may be selected from the other edge nodes other than the second edge nodes in the first edge node set, and then, whether there is an edge node meeting the preset condition in the selected edge nodes is determined. If there is the edge node meeting the preset condition, the edge node meeting the preset condition is selected to replace the first edge node to execute the task. If there is no edge node meeting the preset condition, selection continues to be performed on remaining edge nodes.

Figure 10:
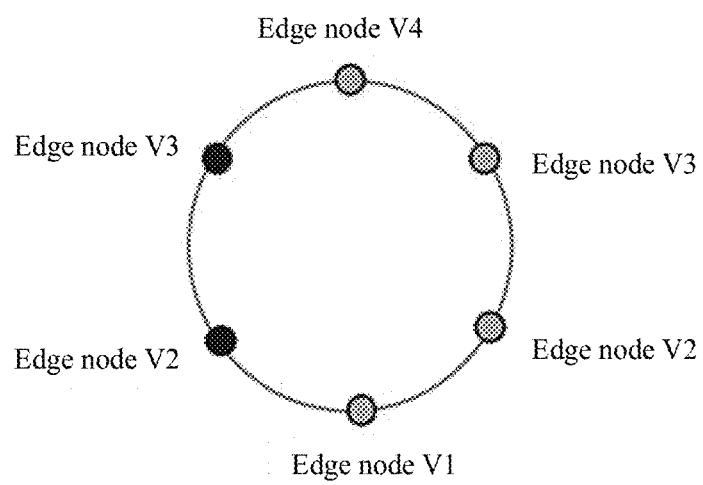
FIG. 10 is a schematic diagram of an embodiment of a hash ring corresponding to a first edge node according to an embodiment of this disclosure.

For example, FIG. 10 is a schematic diagram of an embodiment of a hash ring corresponding to a first edge node according to an embodiment of this disclosure. As shown in FIG. 10, the hash ring includes one edge node V1, two edge nodes V2, two edge nodes V3, and one edge node V4. It is assumed that a first edge node is the edge node V1, and second edge nodes is the edge nodes V2. If the edge node V1 is faulty, the two edge nodes V2 may first negotiate to select one from the two edge nodes V2 to replace the edge node V1 to execute a task. If neither of the two edge nodes V2 meets a preset condition, an edge node may be selected from the two edge nodes V3 adjacent to the two edge nodes V2 to replace the edge node V1 to execute the task. If neither of the two edge nodes V3 meets the preset condition, whether the edge node V4 meets the preset condition is determined. If the edge node V4 meets the preset condition, the edge node V4 is used to replace the edge node V1 to execute the task.

It can be learned from the foregoing content that, when the first edge node is faulty, the second edge node selects the edge node from the first edge node set to replace the first edge node to execute the task. It should be noted that when there is no edge node meeting the preset condition in the first edge node set, that is, there is no edge node in the first edge node set that can replace the first edge node to execute the task, the second edge node can further select the edge node from the other edge node set to replace the first edge node to execute the task, and a specific selection process is not described in detail herein.

It may be understood that the second edge node may also be selected to execute the task of the first edge node. Therefore, in another embodiment of the method for controlling the edge node provided in embodiments of this disclosure, the method further includes the following steps.

Step 403: If the second edge node is selected to execute the task of the first edge node, and no layered image is deployed on the second edge node, the second edge node obtains X layered images from L edge nodes based on the deployment information of the application image to form the application image.

When no layered image is deployed on the second edge node, it indicates that the second edge node is used as the alternative deployment node, and therefore the second edge node needs to obtain the X layered images based on the deployment information of the application image to form the application image.

Step 404: The second edge node runs the application image to execute the task of the first edge node.

After obtaining the application image, the second edge node may run the application image to execute the task of the first edge node.

It may be understood that if the second edge node is selected to execute the task of the first edge node, and no layered image is deployed on the second edge node, it can be learned from the foregoing embodiment that the second edge node obtains the layered images in advance based on the deployment information of the application image to form the application image. Therefore, the second edge node may directly execute the task of the first edge node without obtaining the layered images again.

In the foregoing content, if the first edge node is faulty, the second edge node reselects the edge node to execute the task of the first edge node. In addition, because the faulty first edge node is responsible for performing fault detection on some edge nodes, the second edge node performs fault detection on the edge nodes after the first edge node is faulty. The hash ring shown in FIG. 10 is used as an example. It is assumed that the second edge node and the first edge node are adjacent in the hash ring. For the edge node V1, the two edge nodes V2 are adjacent to the edge node V1. Therefore, when the edge node V2 is used as the first edge node, the edge node V1 needs to perform fault detection on the two edge nodes V2; when the edge node V1 is used as the first edge node, the two edge nodes V2 need to perform fault detection on the edge node V1; and when the edge node V1 is faulty, the two edge nodes V2 perform fault detection on each other.

The following describes a control node and an edge node in embodiments of this disclosure.

Figure 11:
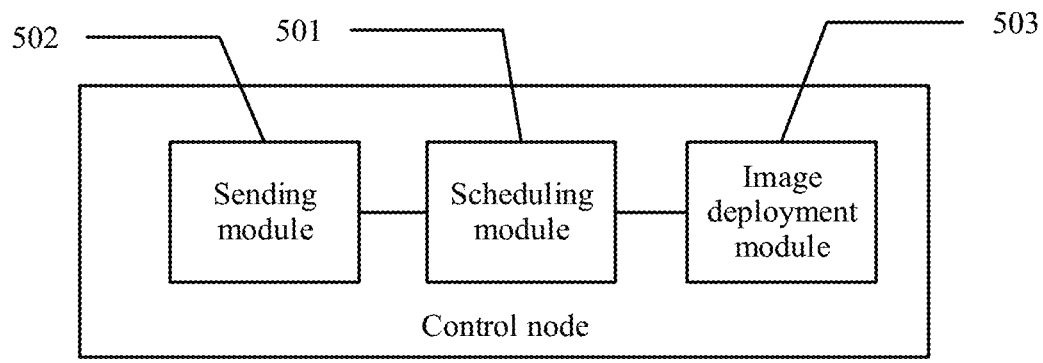
FIG. 11 is a schematic diagram of an embodiment of a control node according to an embodiment of this disclosure.

FIG. 11 is a schematic diagram of an embodiment of a control node according to an embodiment of this disclosure. As shown in FIG. 11, in the embodiment of the control node according to embodiments of this disclosure, the control node includes the following modules.

A scheduling module 501 is configured to divide a plurality of edge nodes included in an edge node cluster into N edge node sets, where each edge node set includes at least two edge nodes, and N is a positive integer.

The scheduling module 501 is further configured to select M second edge nodes from a first edge node set, where the first edge node set is one of the N edge node sets, and M is a positive integer.

A sending module 502 is configured to send a control rule to the M second edge nodes, where the control rule indicates the second edge node to perform fault detection on a first edge node, and the first edge node belongs to the first edge node set.

In another embodiment of the control node provided in embodiments of this disclosure, the scheduling module 501 is configured to select, based on a to-be-deployed application image and an application image that has been deployed on the plurality of edge nodes included in the edge node cluster, K edge nodes from the plurality of edge nodes to form the first edge node set, where K is a positive integer greater than M.

In another embodiment of the control node provided in embodiments of this disclosure, the scheduling module 501 is further configured to enable the K edge nodes to form a hash ring.

In another embodiment of the control node provided in embodiments of this disclosure, the first edge node and at least one second edge node are adjacent in the hash ring.

In another embodiment of the control node provided embodiments of this disclosure, the control node further includes an image deployment module 503.

The image deployment module 503 is configured to deploy X layered images included in the to-be-deployed application image on L edge nodes in the first edge node set, where at least one layered image is deployed on each of the L edge nodes, and both L and X are positive integers greater than 1.

In another embodiment of the control node provided in embodiments of this disclosure, the sending module 502 is further configured to send deployment information of the to-be-deployed application image to an edge node in the first edge node set, where the deployment information of the application image includes deployment of the layered image in the to-be-deployed application image deployed on each of the L edge nodes.

Figure 12:
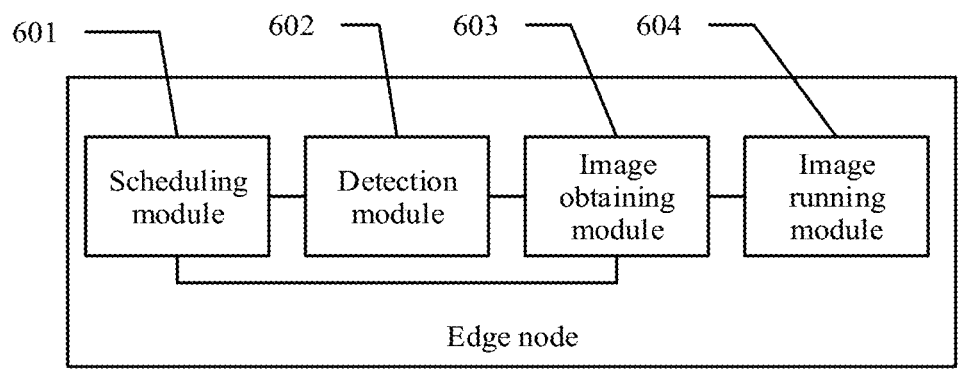
FIG. 12 is a schematic diagram of an embodiment of an edge node according to an embodiment of this disclosure.

FIG. 12 is a schematic diagram of an embodiment of an edge node according to an embodiment of this disclosure. As shown in FIG. 12, this embodiment of this disclosure provides the edge node. The edge node is a second edge node in a first edge node set, the first edge node set is one of N edge node sets, the N edge node sets are obtained by dividing a plurality of edge nodes included in an edge node cluster, each edge node set includes at least two edge nodes, the second edge node stores a control rule, and N is a positive integer; and the second edge node includes: a scheduling module 601, configured to determine a first edge node from the first edge node set according to the control rule, where the control rule indicates the second edge node to perform fault detection on a first edge node; and a detection module 602, configured to perform fault detection on the first edge node.

In another embodiment of the edge node provided in embodiments of this disclosure, the edge nodes in the first edge node set form a hash ring; and the first edge node and the second edge node are adjacent in the hash ring.

In the other embodiment of the edge node provided in embodiments of this disclosure, at least one of the X layered images included in the application image is deployed on each of the L edges in the first edge node set, and both L and X are positive integers greater than 1; each edge node in the first edge node set stores deployment information of the application image, and the deployment information of the application image includes deployment of the layered image in the application image deployed on each of the L edge nodes; and the edge node further includes: an image obtaining module 603, configured to obtain, when H layered images are deployed on the second edge node, (X−H) layered images from another edge node in the L edge nodes based on the deployment information of the application image, to form the application image, where H is a positive integer, and X is a positive integer greater than H; and an image running module 604, configured to run the application image to execute a corresponding task.

In the other embodiment of the edge node provided in embodiments of this disclosure, the scheduling module 601 is configured to determine, when the first edge node is faulty, based on the deployment information of the application image, deployment of a layered image in the application image deployed on the first edge node.

The scheduling module 601 is further configured to select, when at least one layered image is deployed on the first edge node, an edge node from the first edge node set to execute the task of the first edge node.

In the other embodiment of the edge node provided in embodiments of this disclosure, the image obtaining module 603 is further configured to obtain, if the second edge node is selected to execute the task of the first edge node, and no layered image is deployed on the second edge node, the X layered images from the L edge nodes based on the deployment information of the application image to form the application image.

The image running module 604 is further configured to run the application image to execute the task of the first edge node.

Figure 13:
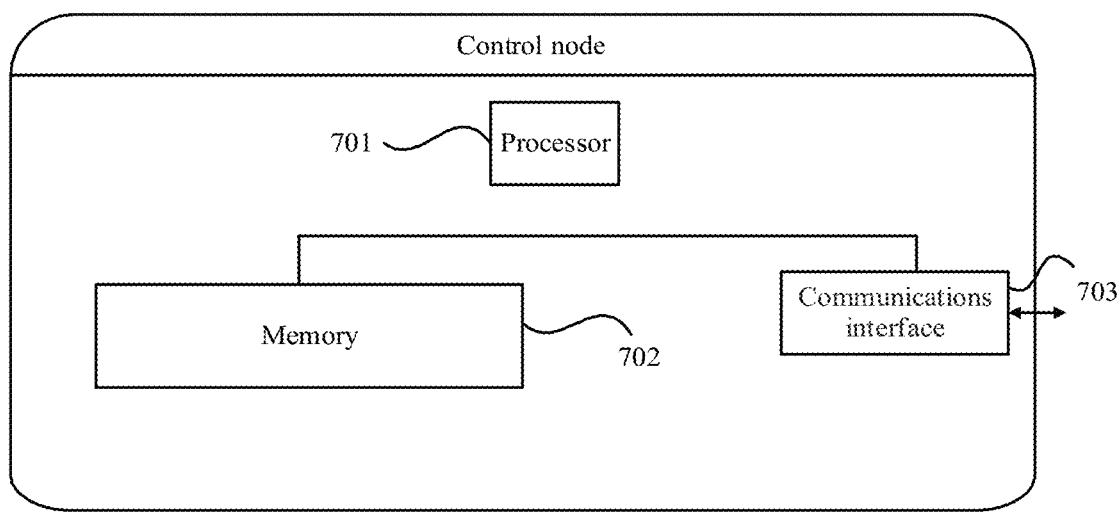
FIG. 13 is a schematic diagram of another embodiment of a control node according to an embodiment of this disclosure.

Refer to FIG. 13. An embodiment of a control node in embodiments of this disclosure may include one or more processors 701, a memory 702, and a communications interface 703.

The memory 702 may perform transitory storage or persistent storage. Further, the processor 701 may be configured to communicate with the memory 702, and perform, on the control device, a series of instruction operations in the memory 702.

In this embodiment, the processor 701 may perform the operations performed by the control node in the embodiment shown in FIG. 11. Details are not described herein again.

In this embodiment, specific functional module division in the processor 701 may be similar to functional module division into modules such as the scheduling module, the sending module, and the image deployment module described in FIG. 11, and details are not described herein again.

Figure 14:
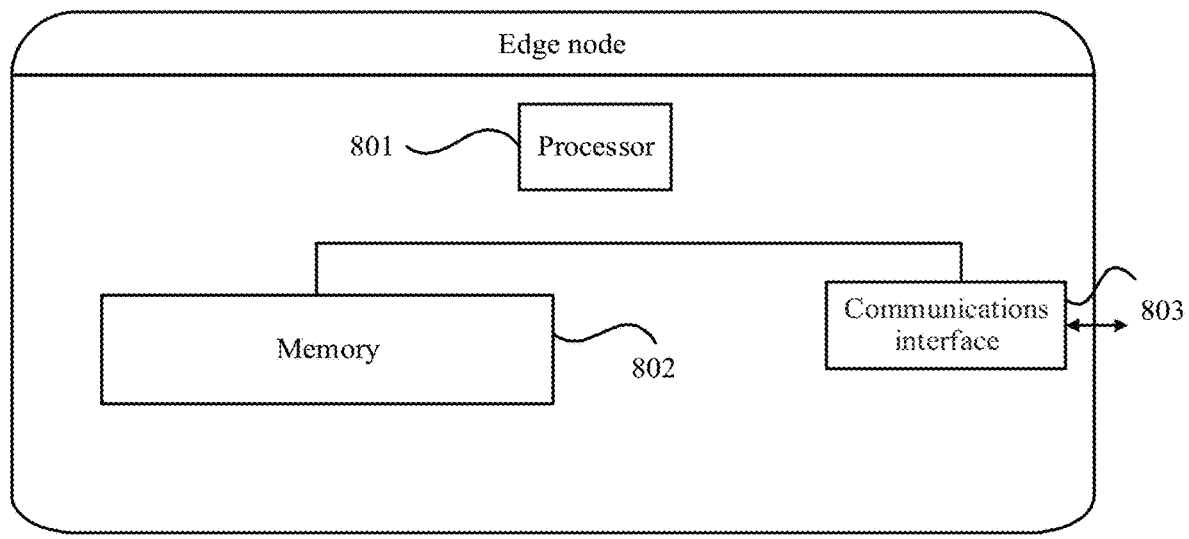
FIG. 14 is a schematic diagram of another embodiment of an edge node according to an embodiment of this disclosure.

Refer to FIG. 14. An embodiment of an edge node in embodiments of this disclosure may include one or more processors 801, a memory 802, and a communications interface 803.

The memory 802 may perform transitory storage or persistent storage. Further, the processor 801 may be configured to communicate with the memory 802, and perform, on the control device, a series of instruction operations in the memory 802.

In this embodiment, the processor 801 may perform the operations performed by the edge node in the embodiment shown in FIG. 12. Details are not described herein again.

In this embodiment, specific functional module division in the processor 801 may be similar to functional module division into modules such as the scheduling module, the detection module, the image obtaining module, and the image running module described in FIG. 12, and details are not described herein again.

Figure 15:
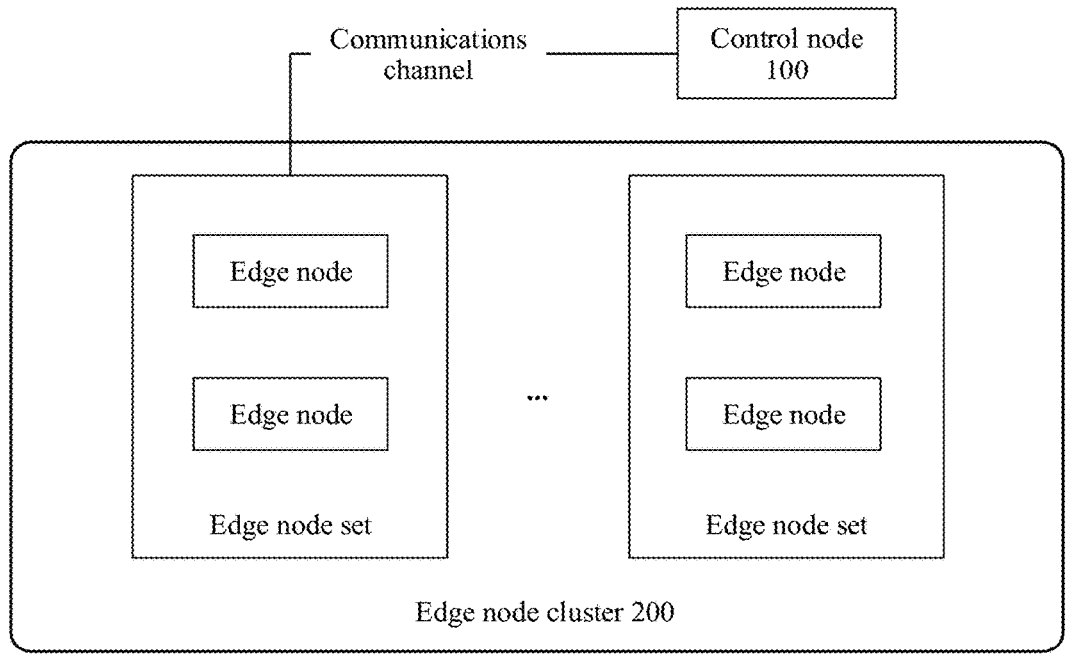
FIG. 15 is a schematic diagram of an embodiment of an edge computing system according to an embodiment of this disclosure.

FIG. 15 is a schematic diagram of an embodiment of an edge computing system according to an embodiment of this disclosure. As shown in FIG. 15, embodiments of this disclosure further provide the edge computing system, including a control node 100 and an edge node cluster 200.

A plurality of edge nodes included in the edge node cluster 200 are divided into N edge node sets, each edge node set includes at least two edge nodes, a first edge node set in the N edge node sets includes a second edge node, the second edge node stores a control rule, and N is a positive integer.

The control node 100 is configured to perform the method for controlling the edge node according to any one of the first aspect or the possible implementations of the first aspect.

The second edge node is configured to perform the method for controlling the edge node according to any one of the second aspect or the possible implementations of the second aspect.

An embodiment of this disclosure further provides a chip or a chip system. The chip or the chip system includes at least one processor and a communications interface. The communications interface is interconnected to the at least one processor through a line. The at least one processor is configured to run computer programs or instructions, to perform the operations performed by the control node in embodiments shown in FIG. 2 and FIG. 7. Details are not described herein again.

The communications interface in the chip may be an input/output interface, a pin, a circuit, or the like.

Embodiments of this disclosure further provide a first implementation of the chip or the chip system. The chip or the chip system described above in this disclosure further includes at least one memory, and the at least one memory stores instructions. The memory may be a storage unit inside the chip, for example, a register or a cache, or may be a storage unit (for example, a read-only memory (ROM) or a random-access memory (RAM)) of the chip.

An embodiment of this disclosure further provides a chip or a chip system. The chip or the chip system includes at least one processor and a communications interface. The communications interface is interconnected to the at least one processor through a line. The at least one processor is configured to run computer programs or instructions, to perform the operations performed by the edge node in embodiments shown in FIG. 8 and FIG. 9. Details are not described herein again.

The communications interface in the chip may be an input/output interface, a pin, a circuit, or the like.

Embodiments of this disclosure further provide a first implementation of the chip or the chip system. The chip or the chip system described above in this disclosure further includes at least one memory, and the at least one memory stores instructions. The memory may be a storage unit inside the chip, for example, a register or a cache, or may be a storage unit (for example, a ROM or a RAM) of the chip.

An embodiment of this disclosure further provides a computer storage medium. The computer storage medium is configured to store computer software instructions used by the foregoing control node or edge node, and the computer software instructions include a program designed for the control node or edge node.

The control node may be the control node described in FIG. 11.

The edge node may be the edge node described in FIG. 12.

An embodiment of this disclosure further provides a computer program product. The computer program product includes computer software instructions. The computer software instructions may be loaded by using a processor to implement procedures of the methods in FIG. 2, FIG. 7 to FIG. 9.

All or some of foregoing embodiments may be implemented by using software, hardware, firmware, or any combination thereof. When software is used to implement the foregoing embodiments, all or some of the foregoing embodiments may be implemented in a form of a computer program product.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, they may be located in one position, or may be distributed on a plurality of network units. Some or all of the units may be selected according to actual requirements to achieve the objective of the solutions of embodiments.

In addition, function units in embodiments of this disclosure may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes: any medium that can store program code, such as a Universal Serial Bus (USB) flash drive, a removable hard disk, a ROM, a RAM, a magnetic disk, or an optical disc.

What is claimed is:

1. A method implemented by a control node, wherein the method comprises:
    dividing edge nodes in an edge node cluster into N edge node sets, wherein each of the N edge node sets comprises at least two of the edge nodes, and wherein N is a first positive integer;
    selecting M second edge nodes from a first edge node set, wherein the first edge node set is one of the N edge node sets, and wherein M is a second positive integer; and
    sending a control rule to the M second edge nodes, wherein the control rule instructs the M second edge nodes to perform fault detection on a first edge node in the first edge node set when the control node cannot perform the fault detection on the first edge node.

2. The method of claim 1, wherein dividing the edge nodes comprises selecting, based on a to-be-deployed application image and an application image that has been deployed on the edge nodes, K edge nodes from the edge nodes to form the first edge node set, and wherein K is a third positive integer greater than M.

3. The method of claim 2, wherein after selecting the K edge nodes, the method further comprises enabling the K edge nodes to form a hash ring.

4. The method of claim 3, wherein the first edge node and at least one of the M second edge nodes are adjacent in the hash ring.

5. The method of claim 1, wherein after dividing the edge nodes, the method further comprises deploying X layered images comprised in a to-be-deployed application image on L edge nodes in the first edge node set, wherein at least one of the X layered images is deployed on each of the L edge nodes, and wherein both L and X are positive integers greater than 1.

6. The method of claim 5, wherein after deploying the X layered images, the method further comprises sending deployment information of the to-be-deployed application image to all edge nodes in the first edge node set, and wherein the deployment information indicates where the X layered images are deployed on the L edge nodes.

7. A method implemented by a second edge node, wherein the method comprises:
    identifying, according to a control rule, a first edge node from a first edge node set in an edge node cluster, wherein the edge node cluster comprises N edge node sets, wherein the N edge node sets comprise the first edge node set, wherein the first edge node set comprises the first edge node and the second edge node, wherein the second edge node comprises the control rule, and wherein the control rule instructs the second edge node to perform fault detection on the first edge node when a control node configured to perform the fault detection on the first edge node cannot perform the fault detection on the first edge node; and
    performing the fault detection on the first edge node.

8. The method of claim 7, wherein the first edge node set comprises a hash ring, and wherein the first edge node and the second edge node are adjacent in the hash ring.

9. The method of claim 7, wherein the first edge node set comprises L edge nodes, wherein at least one of X layered images comprised in an application image is deployed on each of the L edge nodes, wherein both L and X are positive integers greater than 1, wherein each of the L edge nodes stores deployment information of the application image, wherein the deployment information indicates where the X layered images are deployed on the L edge nodes, and wherein the method further comprises:
    obtaining, based on the deployment information, (X-H) layered images from a third edge node in the L edge nodes to form the application image when H layered images are deployed on the second edge node, wherein H is a first positive integer, and wherein X is a second positive integer greater than H; and
    running the application image to execute a corresponding task.

10. The method of claim 9, wherein further comprising:
    determining, based on the deployment information, whether a first one of the X layered images is deployed on the first edge node when the first edge node is faulty; and
    selecting another edge node from the first edge node set to execute a task of the first edge node when the first one of the X layered images is deployed on the first edge node.

11. The method of claim 10, wherein selecting the other edge node comprises:
    obtaining, based on the deployment information, the X layered images from the L edge nodes to form the application image when the second edge node is selected to execute the task and none of the X layered images is deployed on the second edge node; and
    running the application image to execute the task.

12. A control node, comprising:
    a memory configured to store instructions; and
    one or more processors coupled to the memory and configured to execute the instructions to:
        divide edge nodes in an edge node cluster into N edge node sets, wherein each of the N edge node sets comprises at least two of the edge nodes, and wherein N is a positive integer;
        select M second edge nodes from a first edge node set, wherein the first edge node set is one of the N edge node sets, and wherein M is a positive integer; and
        send a control rule to the M second edge nodes, wherein the control rule instructs the M second edge nodes to perform fault detection on a first edge node in the first edge node set when the control node cannot perform the fault detection on the first edge node.

13. The control node of claim 12, wherein the one or more processors are further configured to execute the instructions to select, based on a to-be-deployed application image and an application image that has been deployed on the edge nodes, K edge nodes from the edge nodes to form the first edge node set, and wherein K is a positive integer greater than M.

14. The control node of claim 13, wherein after selecting the K edge nodes, the one or more processors are further configured to execute the instructions to enable the K edge nodes to form a hash ring.

15. The control node of claim 14, wherein the first edge node and at least one of the M second edge nodes are adjacent in the hash ring.

16. The control node of claim 12, wherein after dividing the edge nodes, the one or more processors are further configured to execute the instructions to deploy X layered images comprised in a to-be-deployed application image on L edge nodes in the first edge node set, wherein at least one of the X layered images is deployed on each of the L edge nodes, and wherein both L and X are positive integers greater than 1.

17. The control node of claim 16, wherein after deploying the X layered images, the one or more processors are further configured to execute the instructions to send deployment information of the to-be-deployed application image to all edge nodes in the first edge node set, and wherein the deployment information indicates where the X layered images are deployed on the L edge nodes.

18. The control node of claim 17, wherein the to-be-deployed application image comprises an upper-layer software image.

19. The control node of claim 17, wherein the to-be-deployed application image comprises four layered images.

20. The control node of claim 17, wherein the to-be-deployed application image comprises layered images, and wherein different quantities of the layered images are deployed on the edge nodes.

\* \* \* \* \*

UNITED STATES PATENT AND TRADEMARK OFFICE
CERTIFICATE OF CORRECTION

PATENT NO. : 12,284,242 B2
APPLICATION NO. : 17/852724
DATED : April 22, 2025
INVENTOR(S) : Qi Zhang, Fei Qi and Guansheng Shu It is certified that error appears in the above-identified patent and that said Letters Patent is hereby corrected as shown below:

In the Claims

Claim 10, Column 28, Line 26: "The method of claim 9, wherein further comprising:" should read "The method of claim 9, further comprising:"

Signed and Sealed this
Third Day of June, 2025

Coke Morgan Stewart
*Acting Director of the United States Patent and Trademark Office*